No. 827,674. PATENTED JULY 31, 1906.
J. T. THOMPSON.
MACHINE FOR CUTTING POWDER STRIPS.
APPLICATION FILED SEPT. 9, 1905.

7 SHEETS—SHEET 2.

Witnesses:
Henry Drury
M. M. Hamilton

Inventor:
John T. Thompson
by Harding & Harding
attys

No. 827,674. PATENTED JULY 31, 1906.
J. T. THOMPSON.
MACHINE FOR CUTTING POWDER STRIPS.
APPLICATION FILED SEPT. 9, 1905.

7 SHEETS—SHEET 3.

Witnesses:

Inventor:

No. 827,674. PATENTED JULY 31, 1906.
J. T. THOMPSON.
MACHINE FOR CUTTING POWDER STRIPS.
APPLICATION FILED SEPT. 9, 1905.
7 SHEETS—SHEET 4.
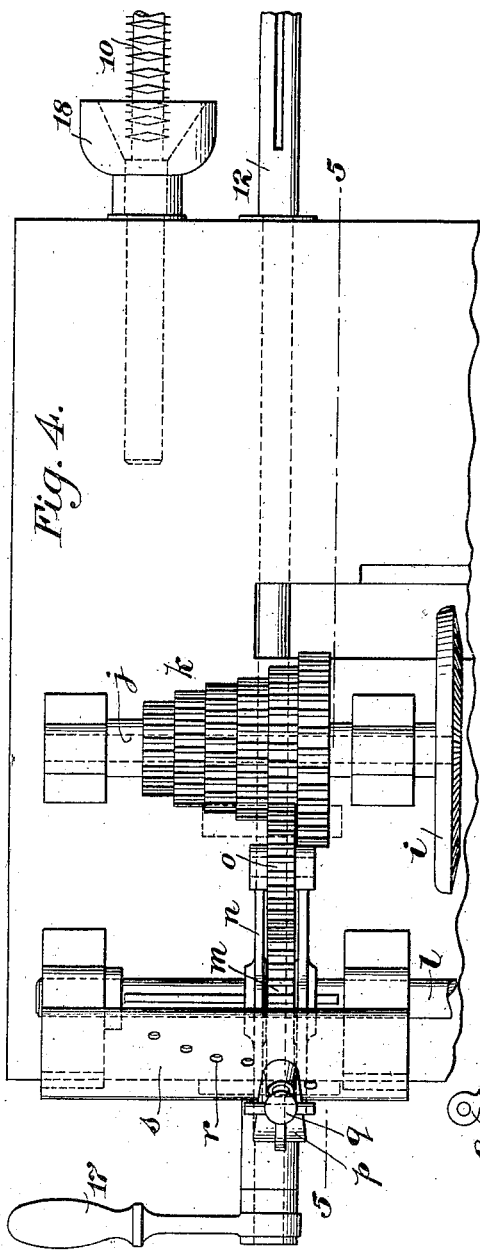
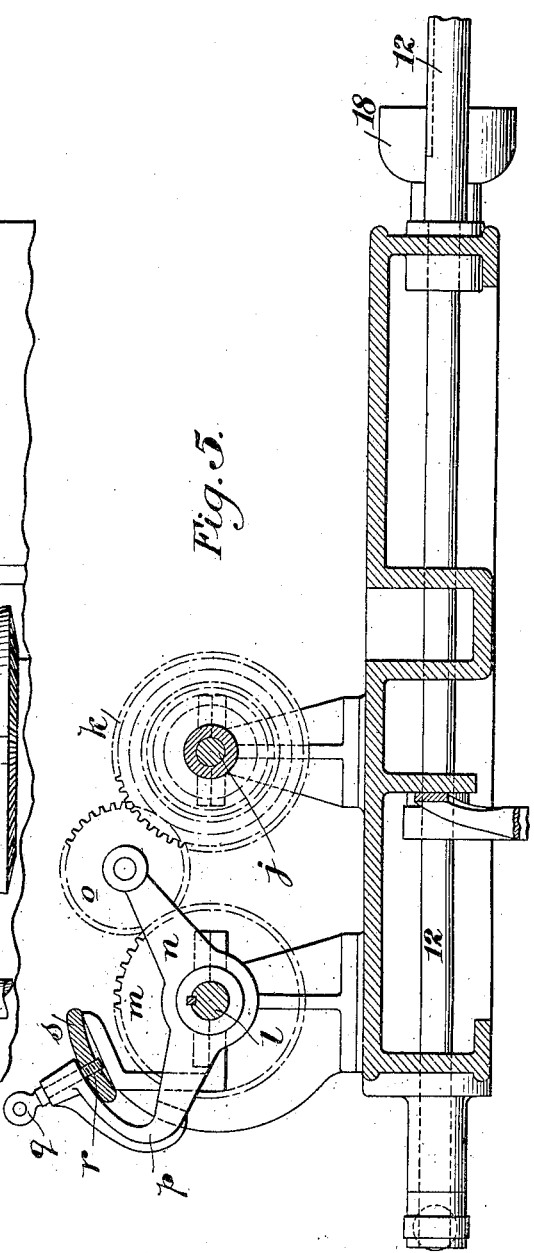
Witnesses:
Inventor:

No. 827,674. PATENTED JULY 31, 1906.
J. T. THOMPSON.
MACHINE FOR CUTTING POWDER STRIPS.
APPLICATION FILED SEPT. 9, 1905.
7 SHEETS—SHEET 5.
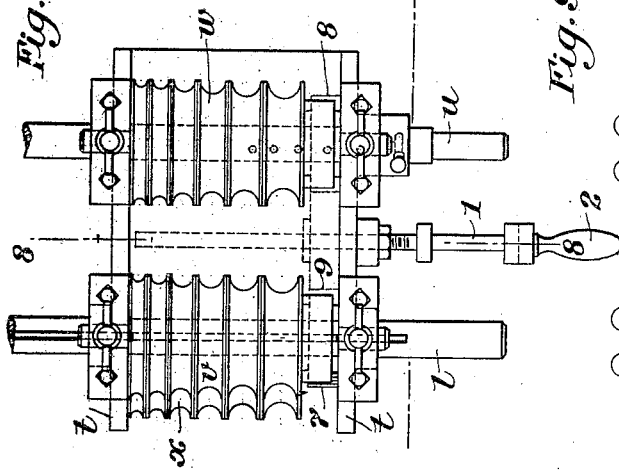
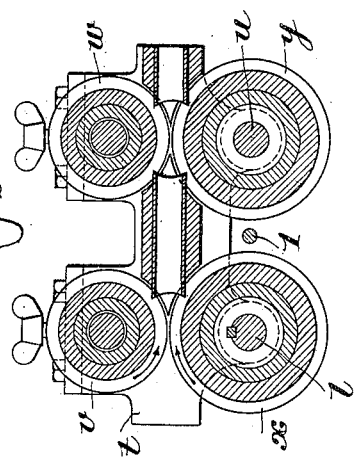
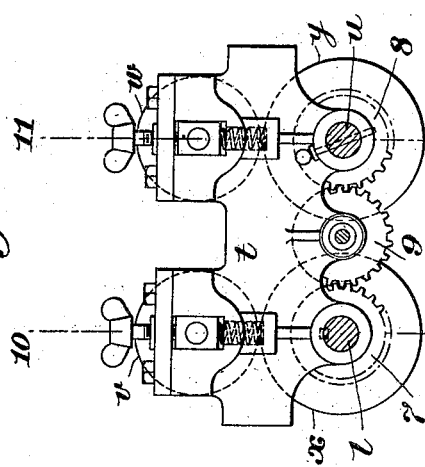
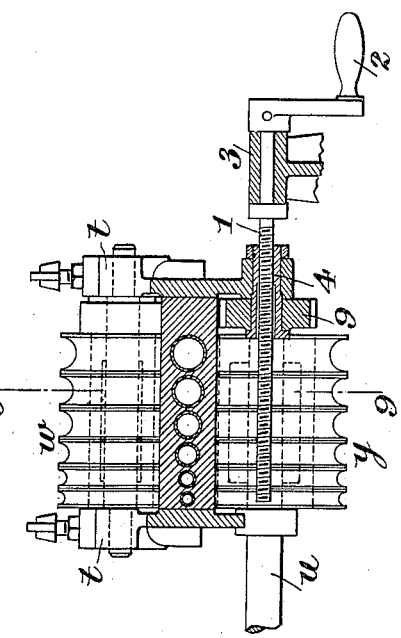
Witnesses:
Henry Drury
M. M. Hamilton
Inventor:
John T. Thompson
W. S. Harding & Harding
attys No. 827,674. PATENTED JULY 31, 1906.
J. T. THOMPSON.
MACHINE FOR CUTTING POWDER STRIPS.
APPLICATION FILED SEPT. 9, 1905.

7 SHEETS—SHEET 6.

Witnesses:

Inventor:

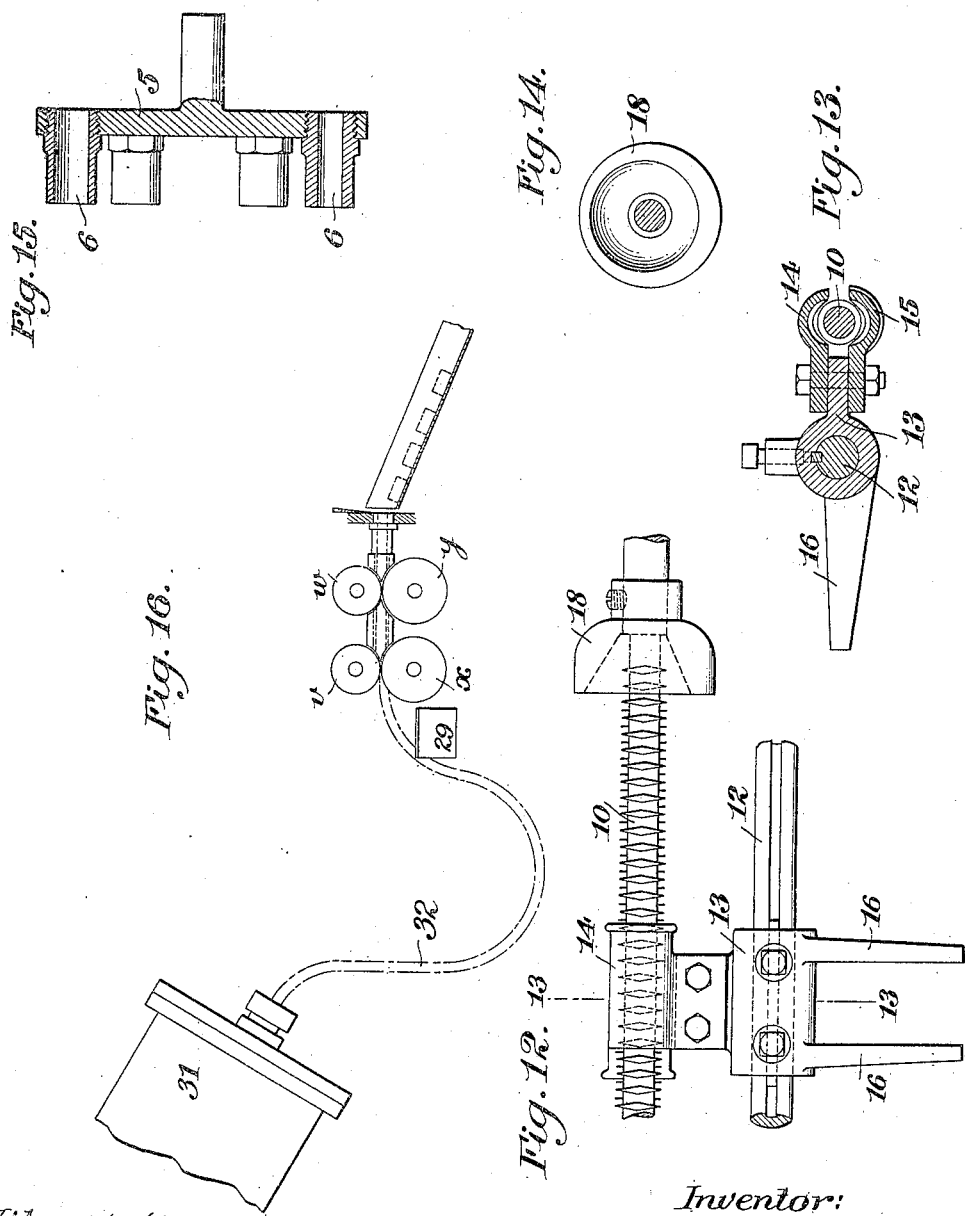

UNITED STATES PATENT OFFICE.

JOHN T. THOMPSON, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

MACHINE FOR CUTTING POWDER STRIPS.

No. 827,674.      Specification of Letters Patent.      Patented July 31, 1906.

Application filed September 9, 1905. Serial No. 277,641.

*To all whom it may concern:*

Be it known that I, JOHN T. THOMPSON, a citizen of the United States, residing at Wilmington, county of Newcastle, and State of Delaware, have invented a new and useful Improvement in Machines for Cutting Powder Strips, of which the following is a full, clear, and exact description, reference being had to the accompanying drawings, which form a part of this specification.

My invention has for its object the construction of a machine whereby powder strips of different sizes may be cut into pieces.

It also has for its object in such a machine to provide means whereby initially the speed of the machine may be adjusted for different speeds of delivery to it of the powder strips and also during operation may be adjusted as that delivery speed varies. It is intended to act in conjunction with a machine for forming such strips and to receive the strip directly therefrom and cut it into pieces.

I will first describe the embodiment of my invention illustrated in the accompanying drawings and then point out the invention in the claims.

Figure 1:
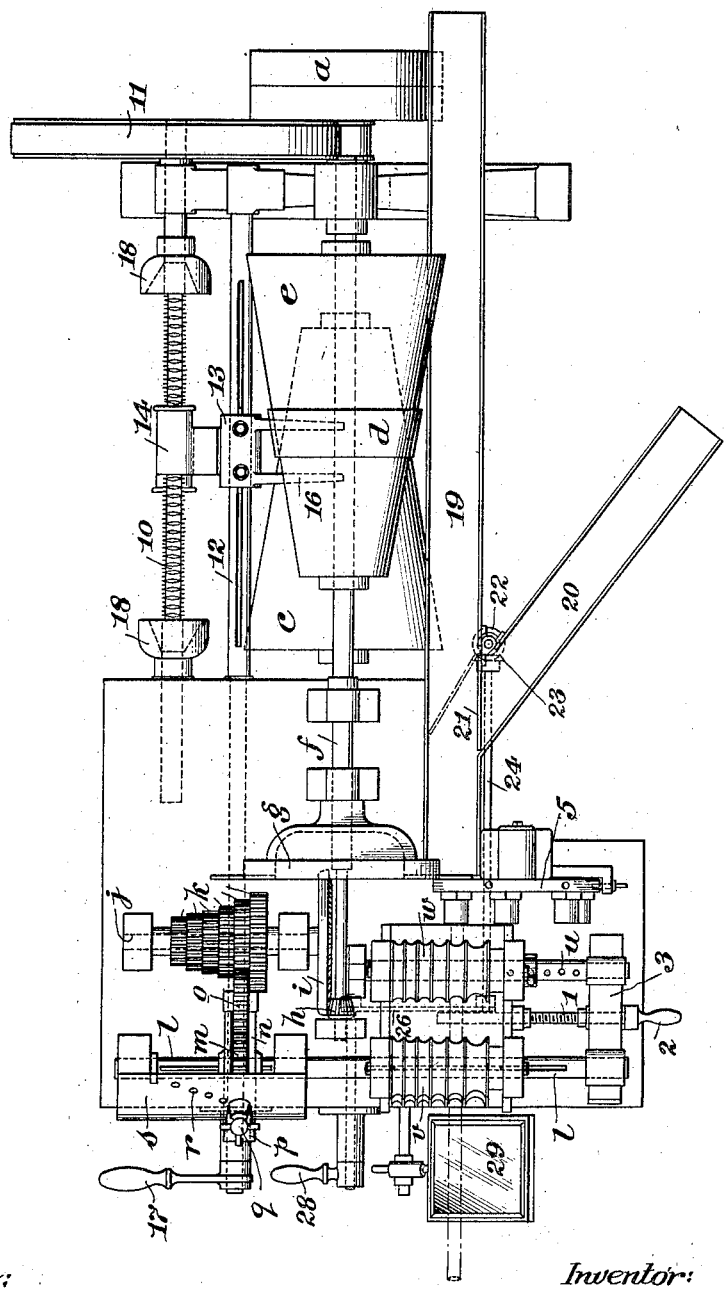
Figure 2:
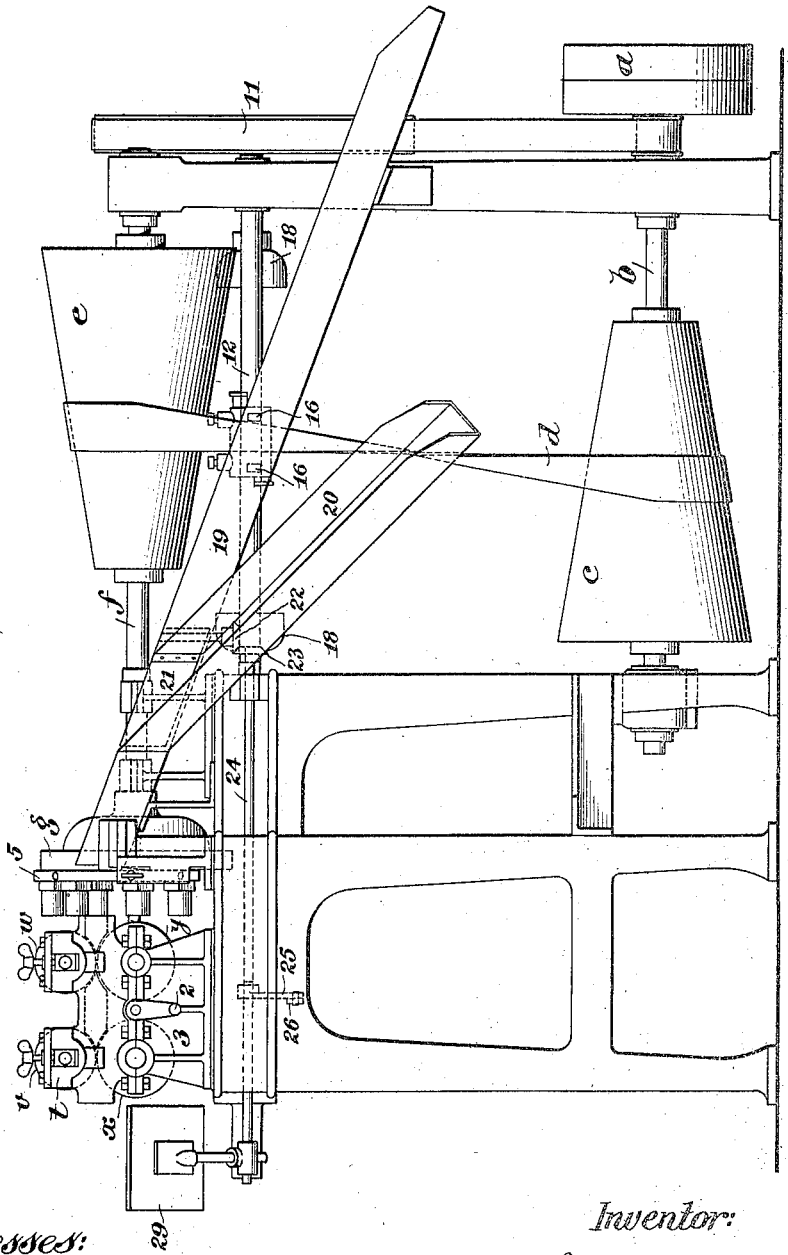
Figure 3:
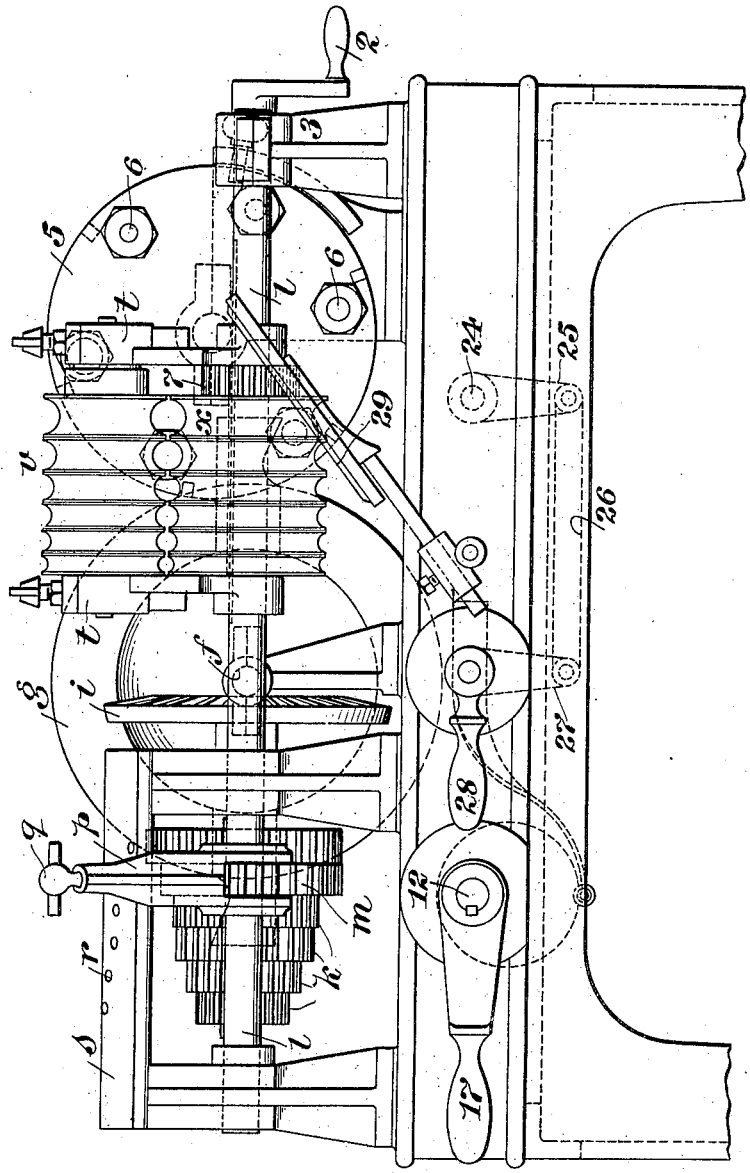
Figure 11:
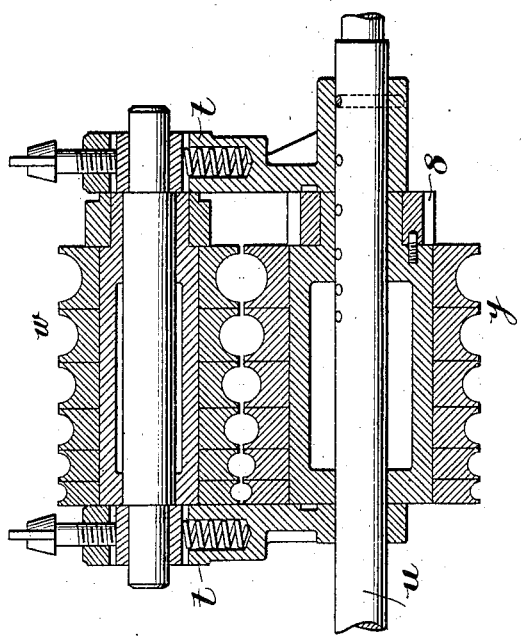
Figure 10:
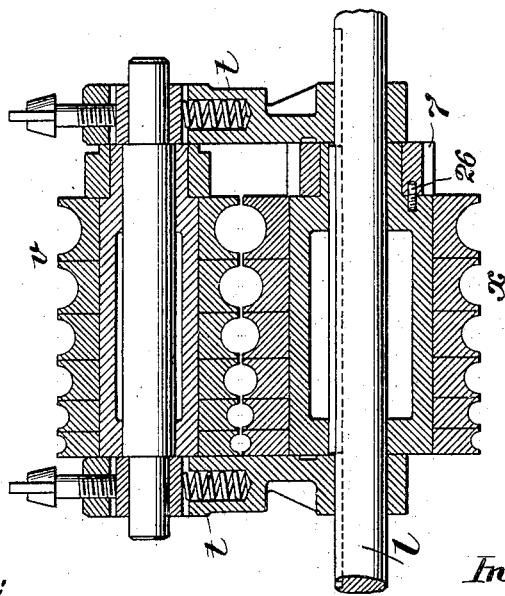

In the drawings, Figure 1 is a plan view of the machine. Fig. 2 is a side elevation. Fig. 3 is an end view, on a larger scale, with a portion of the frame broken away. Fig. 4 is a plan view of speed-gearing arrangement. Fig. 5 is a longitudinal sectional view on line 5 5, Fig. 4. Fig. 6 is a plan view of the feed-rolls and carrying-frame. Fig. 7 is a side elevation of same. Fig. 8 is a transverse section on line 8 8, Fig. 6. Fig. 9 is a longitudinal section on line 9 9, Fig. 8. Fig. 10 is a transverse section on line 10 10, Fig. 7. Fig. 11 is a similar view on line 11 11, Fig. 7.
Fig. 12 is a plan view of belt-shifting arrangement. Fig. 13 is a cross-section on line 13 13, Fig. 12. Fig. 14 is a face view of one of the cone-tripping devices. Fig. 15 is a sectional view of the disk carrying the bushings, having different-sized bores. Fig. 16 is a diagrammatic side elevation, showing the course of the powder from the press through the machine.

*a* is the driving-pulley, driven by a belt (not shown) from a source of power. *b* is the pulley-shaft, on which is the cone-pulley *c*. A belt *d* connects this cone-pulley *c* with the cone-pulley *e* on shaft *f*. On this shaft is the cutter-disk *g*, mounted to revolve with the shaft. On the end of shaft *f* is the bevel-gear *h*, meshing with the bevel-gear *i* on shaft *j*, on which are the gears *k* of different diameters. Splined upon the shaft *l* is the gear *m*, and pivoted upon shaft *i* is the arm *n*, carrying gear *o*, which gear *o* is used to connect the gear *m* and one of the gears *k*. An arm *p*, connected to arm *n*, projects beyond the machine and has connected to it a pin or stop *q*, which is adapted to enter one of the orifices *r* in the plate *s*. By swinging the arm *n* upward and arm *p* downward the gears *m* and *o* may be moved along the shaft *l*, so as to bring the gears in position that the gear *o* will connect the gear *m* and the desired gear *k* to give the desired speed of rotation to shaft *l*. By means of the pin *q* and orifices *r* the gears may be held in the desired position.

Mounted upon a carriage or housing *t*, which is supported loosely upon the shaft *l* and rod *u*, are the sets of rollers, each set comprising two upper rollers *v w* and two lower rollers *x y*. The upper rollers *v w* revolve in bearings in the carriage or housing. The lower rollers *x* are mounted on a sleeve splined upon the shaft *l*, and the lower rollers *y* are mounted on a sleeve loose upon the rod *u*. The pass or opening between different sets of rolls are different sizes. (See Figs. 10 and 11.) Connecting the end of the shaft *l* and rod *u* is the cross-head 3, through which extends the rod 1, having at its outer end the handle 2 and having a threaded portion 3 working in a threaded portion 4 of the housing or carriage. By this construction the carriage and rolls may be moved longitudinally. The outer roll of the rolls *x* has a gear 7 connected to it by a pin 26, the outer roll of the rolls *y* a gear 8 connected to it by a pin, and the two gears are connected by a gear 9, sleeved on the rod 1. Between the rolls and the cutter-disk *g* is the disk 5, mounted so as to be rotatable and having the orifices 6 corresponding to the openings or passes in the rolls. The position of this disk is such that an orifice at one face of the plate is contiguous to the mouth of the pass in the rolls, and the same orifice at the opposite face of the disk is in line with the cutters of the cutting-disk. By moving the carriage as described and rotating the disk 5 the desired size of pass between the rolls and the corresponding sized orifice in the disk 5 will be in alinement with each other and in proper relation to the cutters.

In order to vary the speed of the shaft f, I provide the following means: 10 is a double reverse threaded rod driven or rotated by means of the belt 11. Secured upon the rock-shaft 12 parallel to the shaft f is the plate 13. Projecting from and secured to this plate are the threaded jaws 14 15, one adapted to engage one thread of the rod 10, the other the other thread. From the opposite side of the plate projects the belt-shifter 16, between which the belt d rests. 17 is a handle at end of rock-shaft 12. By moving this handle the shaft 12 may be rocked and either jaw 14 or jaw 15 brought into engagement with the threaded shaft 10. When this is done, the belt-shifter moves longitudinally, carrying the belt over the cone-pulley, and thus either increasing or decreasing the speed of shaft f, and thus shaft l. This the operator may do during the operation of the machine and without reference to the gears m and k.

In order to limit the travel of the jaws 14 and 15, I provide at each end of the rod 10 a cam-stop 18, which when the jaws reach it acts to disengage the jaws.

19 is a chute adapted to receive the cut pieces of ground strips. This chute has a branch way 20 normally closed by the gate 21. This gate is operated by the gear 22, which in turn is operated by the gear 23 on the shaft 24. At the end of this shaft is the crank 25, connected by the connecting-rod 26 with the crank 27, operated by handle 28. By operating the handle 28 the gate may be moved to close the main chute 19 and open the branch chute 20 to carry defective pieces away from the main receptacle.

In order that the operator may see the character of powder pieces that are being cut and delivered from the machine, I provide an inclined mirror 29 at the back of the machine, which is at such an angle that it reflects the powder pieces as they pass from the machine into view of the operator.

With my machine the rolls v, w, x, and y of the desired size pass from the strip and are brought into conjunction with the corresponding orifice of the disk 5. The gear m is brought into connection with the desired gear k. The strip from the press is carried by the rolls to the cutters, where it is cut into pieces and falls into the chute. During the operation of the machine the speed is regulated to conform to the delivery of the strip to the rolls by the threaded rod 10 and its coacting parts, and the admixture of properly and improperly cut pieces in the same receptacle is prevented by the operation of the gate 21, as described.

My machine is adapted for varying sizes of strips, and also can readily be adjusted for different speeds of production of the strip, and can also during operation be adjusted to accommodate for changes in the speed of delivery.

As stated, my machine is adapted to receive the strip direct from the machine and cut it up into lengths. In Fig. 16, 31 is the machine in which the strip is formed, and 32 the strip itself.

Having now fully described my invention, what I claim, and desire to protect by Letters Patent, is—

1. In a machine for cutting powder strips, in combination, a plurality of sets of feed-rolls, there being orifices of different sizes between different sets of rolls, and a longitudinally-movable support for said rolls.

2. In a machine for cutting powder strips, in combination, a plurality of sets of feed-rolls, there being orifices of different sizes between different sets of rolls, a revolving disk having orifices corresponding with the orifices between the rolls, said rolls being supported so as to move longitudinally, whereby corresponding orifices in the rolls and the disk may be brought into alinement.

3. In a machine for cutting powder strips, in combination, a plurality of sets of feed-rolls, there being orifices of different sizes between different sets of rolls, a revolving disk having orifices corresponding with the orifices between the rolls, said rolls being supported so as to move longitudinally, whereby corresponding orifices in the rolls and the disk may be brought into alinement, and means to rotate and vary the rotation of said feed-rolls.

4. In a machine for cutting powder strips, in combination, a plurality of sets of feed-rolls, there being orifices of different sizes between different sets of rolls, a revolving disk having orifices corresponding with the orifices between the rolls, said rolls being supported so as to move longitudinally, whereby corresponding orifices in the rolls and the disk may be brought into alinement, a revolving disk carrying cutters revolving in line with said orifice-disk.

5. In a machine for cutting powder strips, in combination, a plurality of sets of feed-rolls, there being orifices of different sizes between different sets of rolls, a revolving disk having orifices corresponding with the orifices between the rolls, said rolls being supported so as to move longitudinally, whereby corresponding orifices in the rolls and the disk may be brought into alinement, a revolving disk carrying cutters revolving in line with said orifice-disk, a shaft for revolving said feed-rolls, gears of different size on said shaft, a shaft, parallel with the first-mentioned shaft, driven from the source of power, a gear rotatable with and movable along said shaft, a gear adapted to connect said lastmentioned gear and the one of the first-mentioned gears in alinement therein.

6. In a machine of the character described, in combination, a plurality of sets of rolls, the sets of rolls having orifices of different sizes between them, a carriage upon which all of said rolls are supported, and rods or shafts upon which said carriage is mounted so as to be movable longitudinally thereon.

7. In a machine of the character described, in combination, a plurality of sets of rolls, the sets of rolls having orifices of different sizes between them, a carriage upon which all of said rolls are supported, and rods or shafts upon which said carriage is mounted so as to be movable longitudinally thereon, a driving roll or rolls, said driving roll or rolls being splined on said shaft.

8. In a machine of the character described, in combination, feed-rolls, a shaft and driving connection between said shaft and feed-rolls, a cone-pulley on said shaft, a belt on said cone-pulley, a double-threaded rod parallel with said shaft, means to rotate said rod, a rock-shaft, a plate carried by said rock-shaft, a shifting fork, projecting from said plate, between which said belt rests, threaded jaws extending from said plate in line with said threaded rod, and means to rock said rock-shaft.

9. In a machine of the character described, in combination, feed-rolls, a shaft and driving connection between said shaft and feed-rolls, a cone-pulley on said shaft, a belt in said cone-pulley, a double-threaded rod parallel with said shaft, means to rotate said rod, a rock-shaft, a plate carried by said rock-shaft, a shifting fork, projecting from said plate, between which said belt rests, threaded jaws extending from said plate in line with said threaded rod, means to rock said rock-shaft, and a cam at or near each end of said threaded rod adapted when struck by said jaws, to rock said rock-shaft and release said jaws.

10. In a machine of the character described, the combination with the feed-rolls, cutting-disk and cutters, of a two-way chute leading therefrom, a gate normally closing one way of said chute, and means to move said gate to open said way and close the other way.

11. In a machine of the character described, the combination with the feed-rolls cutting-disk and cutters, of a mirror placed beyond said cutters at an angle to reflect in front of said feed-rolls.

In testimony of which invention I have hereunto set my hand, at Wilmington, Delaware, on this 12th day of August, 1905.

JOHN T. THOMPSON.

Witnesses:
   THOMAS S. DOHERTY,
   J. ELMER WATTS.